United States Patent Office 2,766,152

Patented Oct. 9, 1956

2,766,152

METHOD OF PRODUCING GERMANIUM CRYSTALS

Eugene Wainer, Cleveland Heights, and Morris A. Steinberg, Shaker Heights, Ohio, assignors to Sylvania Electric Products Inc., a corporation of Massachusetts No Drawing. Application November 16, 1951, Serial No. 256,832

7 Claims. (Cl. 148—1.6)

This invention relates to a method of producing germanium crystals. More particularly, it relates to a method for producing crystals of germanium suitable for rectification application.

The prior art processes for the preparation of germanium semi-conductors for use in crystal rectifiers and amplifiers has been fairly well established and consists of the following steps. First, the purification of the germanium. Second, the addition of controlled amounts of a selected impurity for the purpose of producing the desired properties. Third, the preparation of an ingot from which the wafers used in the crystal rectifier cartridge are cut. Fourth, the preparation of the surface of the wafers by a process of polishing, heat treating and etching. Fifth, shaping and pointing the cat whisker and sixth, assembling and adjusting the diode and performance testing.

These steps as can be seen are relatively numerous and involve a marked amount of waste of the germanium during the cutting and preparation steps of the process.

It is, therefore, an object of this invention to provide a method of making germanium crystals which will shorten considerably the number of steps involved in the making of a crystal rectifier.

It is a further object of this invention to provide a method which will eliminate to a large extent the amount of germanium wasted by the prior art practice.

It is a further object to provide a simple and economic method of producing germanium crystals which are suitable for use as rectifiers.

In accordance with this invention these objects and other advantages can be achieved by the crystallization of germanium from molten metal alloys of germanium. The alloys which are preferably utilized for this purpose are those in which germanium shows complete miscibility in the liquid state and immiscibility in the solid state. Binary alloys which undergo a eutectic reaction on cooling may also be utilized but only the germanium crystals of primary crystallization are of interest. Immiscibility or nearly complete immiscibility is also a prerequisite in these systems.

The examples of systems of germanium which may be utilized for this purpose are as follows:

Ge *binary systems*

| | |
|---|---|
| (1) Ge-Sn | (6) Ge-Zn |
| (2) Ge-Pb | (7) Ge-Al |
| (3) Ge-Sb | (8) Ge-Au |
| (4) Ge-Bi | (9) Ge-Ag |
| (5) Ge-Cd | |

Ge *ternary systems*

| | |
|---|---|
| (1) Ge-Cd-Ag | (4) Ge-Bi-Sb |
| (2) Ge-Sn-Pb | (5) Ge-Pb-Ag |
| (3) Ge-Zn-Cd | |

In order to obtain the best results and in accordance with the prior art practice in the production of germanium crystals the germanium utilized for these systems are usually prepared by reducing germanium oxide in an atmosphere of hydrogen while maintaining a minimum temperature of 650° C. After all of the germanium oxide has been reduced the temperature is raised to one greater than 960° C. at which temperature the germanium powder is melted. Molten germanium is then allowed to cool to form an ingot of solid germanium metal. This ingot is then crushed and may be used in the following manner to produce single crystals of germanium of suitable size for use in crystal rectifiers. A predetermined amount of germanium is alloyed with a known amount of any one of the metals above with which germanium forms a suitable type of binary system. The mixture is then placed in a crucible under a protective atmosphere (gaseous) or flux (neutral salt) and brought to a temperature at which the mixture forms a one phase liquid. After a suitable homogenization treatment at this temperature the temperature of the bath is lowered below the liquidus temperature of the binary alloy but above the solidus, in other words, to a temperature within the two phase region where a solid can coexist with the liquid phase. As soon as the supercooling of the liquid phase has been carried out primary crystals of germanium will nucleate in the liquid bath and continue to grow until the supersaturation of the liquid has been relieved. After a sufficient time has elapsed for the growth of the crystals the bath is cooled to room temperature and the single crystals of germanium may then be recovered by dissolving out the solid metal alloy in a concentrated acid or base solution, the solvent used being dependent upon the metal which has been used along with the germanium for the growing of the crystals. By following this procedure it is possible to entirely remove the second metal leaving behind a residue of single crystals of germanium which are insoluble in most acids and bases. This residue may then be washed and dried whereupon they are ready for treatment in preparation for their use as rectifiers. This treatment may include a heat treatment in vacuum at 500° C. for one hour after etching in a special etchant for one hour, after which they may be polished and re-etched after being mounted in crystal holders.

One of the requirements for crystal rectifiers is that the crystal shall be of optimum size and shape, about 2 mm. x 2 mm. x 0.5 mm. thick with flat surfaces. The conditions of crystal growth can be so controlled in the production of single crystals of germanium from molten alloy solutions that a predominate number of the crystals produced by this process end up as plates. This requires having the conditions of concentration, temperature, time, rate of cooling, and degree of supersaturation controlled so that the right size and shape of the crystals of germanium result.

It is a well known fact that if a saturated solution of a binary alloy is cooled to a temperature where supersaturation results with respect to one of the elements, thermodynamics predicts that a new phase will precipitate out relieving this supersaturation. The degree of undercooling and the degree of supersaturation have a marked effect on the critical size and number of the nuclei which crystallize out of solution.

At temperatures just below the saturation temperature, the rate of crystallization is very low as both the degree of saturation and the change in volume free energy of the system is quite small. This results in few nuclei of rather large critical size for crystallization. Isothermal treatment at this temperature enables these nuclei to grow to large sized crystals.

With increased undercooling, the rate of crystallization increases steadily and the critical size of the nuclei decreases, but their number increases. Hence, on isothermal treatment at this subcritical temperature, many small crystals of germanium result.

In addition to the thermodynamic reasons for the formation and growth of these crystal nuclei, crystallographic considerations dealing with the internal structural arrangement of the crystal atoms determine the final shape of the crystal. These considerations relate the face developments of the crystal to the internal structure. When a crystal begins to grow from a nucleus, it has different rates of growth in different crystallographic directions, otherwise the resulting crystal will always be spherical. The fact that spherical crystals are practically never obtained attests to the fact that the velocity of growth is a vectorial property.

The planes which bound the crystal are those which have grown the slowest in a direction perpendicular to themselves. These planes of slowest growth are those which are the most closely packed.

The "recticular density" which is the number of atoms per unit surface area can be taken as a measure of the order of closeness of packing. In addition, the growth phenomenon is dependent on the rate of diffusion of atoms from the saturated solution to the crystal face, and this rate of diffusion is dependent on the temperatures and the concentration or degree of supersaturation. A rapidly growing crystal will, therefore, be expected to exhaust the material in its immediate vicinity and any protrusion of the crystal into the solution will be more favorably situated than the rest of the crystal for continued growth. This results in, first, needle-like crystals or dendrites, and secondly, plate-like crystals. At smaller saturations, higher temperatures, and longer times, plates and polyhedra can be expected.

With a fairly large concentration of germanium in a Ge-Sn bath and a large degree of supersaturation and slow cooling rather than isothermal holding at the supersaturation temperature, germanium needles and dendrites can be obtained. Large polyhedral germanium crystals can be produced with a bath of the same composition, by utilizing a smaller degree of supersaturation and by isothermally growing the crystals for an extended time. With low concentrations of germanium, and a higher degree of super-cooling with extended growth times, plates of germanium can be obtained.

In commercial practice, tin is the preferred doping agent for the preparation of N-type high back voltage semiconductors. The addition of tin cannot increase the number of charge carriers in the semiconductor since tin is also a group IV B element. Indications, from the spectrographic analysis point to the fact that the impurities present in the germanium metal as produced from $GeO_2$ are in all probability in amounts greater than the optimum for obtaining high-inverse-voltage crystal rectifiers. On the other hand, it is possible that the tin acts as a cleansing agent in germanium reacting with some of the impurities and precipitating them at the grain boundaries; since, when over 0.1 atomic percent tin is added to germanium tin shows up at the grain boundaries. Amounts in excess of 0.1 atomic percent of tin do not affect the rectification characteristics of germanium.

Single crystals of germanium containing N-P type barriers can be produced by crystallization from molten metal solutions. An ideal alloy to use is one in the Sn-Zn-Ge system.

Sn and Zn are almost completely insoluble in each other in the solid, but completely soluble in the liquid, so that no compounds or phases will result. The Pb, Zn, Ge system can also be utilized. Above 420° C., the Pb-Zn and the Sn-Zn liquid phase separates into two liquids, one liquid high in Zn, the other high in Sn or Pb.

*Examples*

1. 10% by weight of germanium is alloyed with 90% by weight of tin. This mixture is heated to a temperature at which a single phase liquid is formed and then allowed to cool to a temperature of approximately 600° C. where isothermal temperature conditions are maintained for a period of 4 hours during which time the germanium crystallizes out in large octahedral crystals and dendrites after which the resultant material is cooled to room temperature over a period of six hours. The germanium crystals so obtained are removed from the residual metal by dissolving out the remaining tin with the aid of a solvent such as concentrated hydrochloric acid. Crystals so obtained may be washed several times with distilled water and dried in alcohol. Crystals so obtained can be treated in the usual manner to promote activity as a rectifier. They can be fired at 500° C. to anneal them and then etched with an etchant made of 40 cc. HF (52%) 20 cc. $HNO_3$ concentrated 40 cc. of distilled water and 200 mgs. of $Cu(NO_3)_2$ added to every 10 cc. of solution. Crystals so treated have exhibited peak back voltages as high as 80 volts.

2. 10% by weight of germanium is alloyed with 90% by weight of Zn. This mixture is heated to a temperature at which a single phase liquid is formed and then allowed to cool to a temperature of approximately 640° at which temperature it is held for about four hours whereupon it is allowed to cool to room temperature slowly. The crystals are separated from the Zn solvent with the aid of concentrated hydrochloric acid. They are obtained predominantly as plates and dendrites quite uniform in size. These crystals may be further treated as described above in Example 1 to improve their rectification properties.

3. 16.5% by weight of germanium is alloyed with 84.5% by weight of antimony and melted in a zirconium silicate crucible under sodium chloride flux to a temperature at which a single phase liquid is formed. The temperature is then lowered to approximately 625° C. and held there for a prolonged period and allowed to cool to room temperature. The crystals are then recovered by dissolving the antimony after which they can be further treated as per Example 1 to improve the rectification properties.

4. 75% by weight of germanium is alloyed with 25% by weight of aluminum and this mixture is heated in a zirconium silicate boat to a temperature of approximately 860°, cooled to approximately 700° C. and held there for a prolonged period after which it is cooled to room temperature. The crystals obtained after dissolving out the aluminum are irregular in shape and may be annealed and etched as described in Example 1 to improve their rectification properties.

5. Germanium crystals were prepared from tin, zinc, and germanium baths in the following manner: 10% by weight of germanium is alloyed with 90% by weight of zinc and placed in a zirconium silicate crucible with sodium chloride flux over the bath and the crucible covered with a carbon top. This crucible is placed in the furnace along with a second crucible containing an alloyed mixture of 10% germanium and 90% tin by weight similarly covered with sodium chloride flux and a carbon top. Both crucibles are fired at 800° C. for a period of three hours and subsequently held at a temperature of 600° C. for 17 hours. The mixtures from each of the crucibles are then poured together into one crucible which is maintained at a temperature of 600° C. for 22 hours and then allowed to cool over a period of eight hours. Many of the crystals prepared in this manner possess n and p barriers.

While the above description submitted herewith discloses a preferred and practical embodiment of the method of producing germanium crystals it will be understood that the specific details described are by way of illustration and are not to be construed as limiting the scope of the invention.

What is claimed is:

1. In the method of producing germanium crystal rectifiers the steps comprising alloying a predetermined amount of germanium with a metal selected from the group consisting of Sn, Sb, Bi, Cd, Zn, Al, Au and Ag, bringing the alloy to a temperature at which it forms a single phase liquid, lowering the temperature below the liquidus temperature of the alloy but above the solidus, maintaining the alloy at this temperature to crystallize the germanium from the molten solution, cooling to solidify the residual mass and separating the crystals from the residual mass by treatment with a preferentially active solvent.

2. In the method of producing germanium crystal rectifiers the steps comprising alloying a predetermined amount of germanium with a metal selected from the group consisting of Sn, Sb, Bi, Cd, Zn, Al, Au and Ag, bringing the alloy to a temperature at which it forms a single phase liquid, lowering the temperature to just below the saturation temperature of the germanium in the alloy, maintaining isothermal conditions for a prolonged period to form germanium crystals, cooling to room temperature to solidify the residual mass and separating the germanium crystals by treatment with a preferentially acting solvent.

3. In the method of producing germanium crystal rectifiers the steps comprising alloying 10% by weight of germanium with 90% by weight of tin, heating the alloy to form a single phase liquid, reducing the temperature to approximately 650° C., maintaining the temperature for a prolonged period to crystallize out germanium, slowly cooling the resultant mixture of crystal and liquid residue to room temperature to solidify the residue and recovering the germanium crystals by subjecting the cooled resultant to a preferentially acting solvent.

4. In the method of producing germanium crystal rectifiers the steps comprising alloying 25% by weight of germanium with 75% by weight of tin, heating the alloy to form a single phase liquid reducing the temperature to approximately 650° C., maintaining the temperature for a prolonged period to crystallize out germanium, slowly cooling the resultant mixture of crystals and liquid residue to room temperature to solidify the residue and recovering the germanium crystals by subjecting the cooled resultant mixture of crystals and residue to a preferentially acting solvent.

5. In the method of producing germanium crystal rectifiers the steps comprising alloying 10% by weight of germanium with 90% by weight of zinc, heating the alloy to form a single phase liquid reducing the temperature to approximately 640° C., maintaining the temperature for a prolonged period to crystallize out germanium, slowly cooling the resultant mixture of crystals and liquid residue to room temperature to solidify the residue and recovering the germanium crystals by subjecting the cooled resultant mixture of crystals and residue to a preferentially acting solvent.

6. In the method of producing germanium crystal rectifiers the steps comprising alloying 16.5% by weight of germanium with 84.5% by weight of antimony, heating the alloy to form a single phase liquid reducing the temperature to approximately 625° C., maintaining the temperature for a prolonged period to crystallize out germanium, slowly cooling the resultant mixture of crystals and liquid residue to room temperature to solidify the residue and recovering the germanium crystals by subjecting the cooled resultant to a preferentially acting solvent.

7. In the method of producing germanium crystal rectifiers the steps comprising preparing a molten metal alloy of germanium, holding the molten mass at a temperature at which the mixture is in the form of a homogeneous single phase liquid, reducing the temperature and holding it at a point at which the mixture is in the two-phase region where solid can co-exist with the liquid phase and thus cause the germanium to crystallize from the molten metal slowly cooling the resultant mixture of crystals and molten residue to room temperature to solidify the residue and recovering the germanium crystals by subjecting the cooled resultant mixture of crystals and residue to a preferential reacting solvent.

References Cited in the file of this patent

UNITED STATES PATENTS

| | | |
|---|---|---|
| 1,628,190 | Raney | May 10, 1927 |
| 2,047,555 | Gardner | July 14, 1936 |
| 2,074,007 | Wissler | Mar. 16, 1937 |
| 2,209,935 | Samuels | July 30, 1940 |
| 2,576,267 | Scaff | Nov. 27, 1951 |
| 2,602,211 | Scaff et al. | July 8, 1952 |
| 2,637,770 | Lark-Horowitz et al. | May 5, 1953 |

FOREIGN PATENTS

| | | |
|---|---|---|
| 632,942 | Great Britain | Dec. 5, 1949 |

OTHER REFERENCES

"Metals" by Carpenter and Robertson, vol. 1, pp. 228–232, pub. in 1939.

Bureau of Mines, Report of Investigations 5007, especially page 9 and Figure 7. November 1953.

Zeitschrift für Anorganische und Allgemeine Chemie, 241, pages 313, 314, 1939.

OSRD Report P. B.—5200 No. 14–341, pages 3, 5, 8–10. November 1, 1944.